(12) United States Patent
Sung et al.

(10) Patent No.: US 10,335,776 B2
(45) Date of Patent: Jul. 2, 2019

(54) MANGANESE-CONTAINING DIESEL OXIDATION CATALYST

(71) Applicant: BASF Corporation, Florham Park, NJ (US)

(72) Inventors: Shiang Sung, New York, NY (US); Stanley A. Roth, Yardley, PA (US); Claudia Zabel, Hannover (DE); Susanne Stiebels, Adenbüttel (DE); Andreas Sundermann, Bensheim (DE); Olga Gerlach, Ludwigshafen (DE)

(73) Assignee: BASF Corporation, Florham Park, NJ (US)

( * ) Notice: Subject to any disclaimer, the term of this patent is extended or adjusted under 35 U.S.C. 154(b) by 449 days.

(21) Appl. No.: 14/107,704

(22) Filed: Dec. 16, 2013

(65) Prior Publication Data
US 2015/0165422 A1    Jun. 18, 2015

(51) Int. Cl.
*B01D 53/94*    (2006.01)
*B01J 29/076*    (2006.01)
(Continued)

(52) U.S. Cl.
CPC .......... *B01J 29/076* (2013.01); *B01D 53/944* (2013.01); *B01D 53/945* (2013.01);
(Continued)

(58) Field of Classification Search
CPC . B01J 29/076; B01J 37/08; B01J 37/20; B01J 37/10; B01J 37/0244; B01J 37/0246; B01J 37/0248; B01J 2523/00; B01J 2523/25; B01J 2523/31; B01J 2523/3712; B01J 2523/72; B01J 2523/824; B01J 2523/828; B01J 2523/41; B01D 2255/1021; B01D 2255/1023; B01D 2255/2073;
(Continued)

(56) References Cited

U.S. PATENT DOCUMENTS 4,335,023 A    6/1982    Dettling et al.
4,727,052 A    2/1988    Wan et al.
(Continued)

FOREIGN PATENT DOCUMENTS

DE    102011010105    8/2011
EP    0732145    9/1996
(Continued)

OTHER PUBLICATIONS

IN (KR10-2001-0037201, machine translation) (Year: 2001).*
(Continued)

*Primary Examiner* — Melvin C. Mayes
*Assistant Examiner* — Smita S Patel
(74) *Attorney, Agent, or Firm* — Womble Bond Dickinson (US) LLP

(57) ABSTRACT

An oxidation catalyst composite, methods, and systems for the treatment of exhaust gas emissions from a diesel engine are described. More particularly, an oxidation catalyst composite including a first washcoat layer comprising a Pt component and a Pd component, and a second washcoat layer including a refractory metal oxide support containing manganese, a zeolite, and a platinum component is described.

30 Claims, 5 Drawing Sheets

(51) Int. Cl.
*B01J 37/02* (2006.01)
*B01J 35/00* (2006.01)
B01J 23/40 (2006.01)
B01J 23/656 (2006.01)

(52) U.S. Cl.
CPC ....... *B01J 35/0006* (2013.01); *B01J 37/0244* (2013.01); *B01J 37/0246* (2013.01); *B01D 53/9418* (2013.01); *B01D 53/9477* (2013.01); *B01D 2255/1021* (2013.01); *B01D 2255/1023* (2013.01); *B01D 2255/2073* (2013.01); *B01D 2255/20738* (2013.01); *B01D 2255/20746* (2013.01); *B01D 2255/20753* (2013.01); *B01D 2255/50* (2013.01); *B01D 2255/502* (2013.01); *B01D 2255/504* (2013.01); *B01D 2255/9022* (2013.01); *B01D 2255/91* (2013.01); *B01D 2255/912* (2013.01); *B01J 23/40* (2013.01); *B01J 23/6562* (2013.01); *Y02T 10/24* (2013.01)

(58) Field of Classification Search
CPC ........... B01D 2255/20738; B01D 2255/20753; B01D 2255/20746; B01D 2255/50; B01D 2255/502; B01D 2255/504; B01D 2255/9022; B01D 2255/91; B01D 53/94; B01D 53/9418; B01D 53/9477; B01D 53/944; B01D 53/945
See application file for complete search history.

(56) References Cited

U.S. PATENT DOCUMENTS

| | | | |
|---|---|---|---|
| 4,961,917 A | 10/1990 | Byrne | |
| 5,516,497 A | 5/1996 | Speronello et al. | |
| 5,911,961 A | 6/1999 | Horiuchi et al. | |
| 7,964,167 B2 | 6/2011 | Kim et al. | |
| 8,057,767 B1 | 11/2011 | Qi et al. | |
| 8,226,915 B2 | 7/2012 | Qi et al. | |
| 8,377,400 B2 | 2/2013 | Schmieg et al. | |
| 8,404,201 B2 | 3/2013 | Qi et al. | |
| 8,409,518 B2 | 4/2013 | Kim et al. | |
| 8,449,852 B1 | 5/2013 | Sung et al. | |
| 8,491,860 B2 | 7/2013 | Lambert et al. | |
| 8,568,674 B1* | 10/2013 | Sung | B01J 37/0244 423/213.2 |
| 8,628,742 B2 | 1/2014 | Drews et al. | |
| 2004/0103651 A1* | 6/2004 | Bennett | B01D 53/9431 60/286 |
| 2008/0045405 A1 | 2/2008 | Beutel et al. | |
| 2008/0072578 A1* | 3/2008 | Kumar | B01D 53/945 60/299 |
| 2010/0180581 A1 | 7/2010 | Grubert et al. | |
| 2010/0183490 A1* | 7/2010 | Hoke et al. | B01D 53/945 423/213.5 |
| 2011/0165046 A1 | 7/2011 | Drews et al. | |
| 2011/0258994 A1 | 10/2011 | Park et al. | |
| 2012/0036834 A1 | 2/2012 | Qi et al. | |
| 2012/0240554 A1 | 9/2012 | Qi et al. | |
| 2013/0034472 A1 | 2/2013 | Cantrell et al. | |
| 2013/0084222 A1 | 4/2013 | Grubert et al. | |
| 2013/0149220 A1 | 6/2013 | Swallow et al. | |
| 2014/0050629 A1 | 2/2014 | Masuda et al. | |
| 2014/0065042 A1 | 3/2014 | Andersen et al. | |

FOREIGN PATENT DOCUMENTS

| | | |
|---|---|---|
| GB | 2481057 | 12/2011 |
| JP | 05-138026 | 6/1993 |
| JP | 2002-089246 | 3/2002 |
| JP | 2003-080033 | 3/2003 |
| JP | 2006-205037 | 8/2006 |
| KR | 20010037201 A | 5/2001 |
| KR | 20080103623 A | 11/2008 |
| RU | 2259228 C2 | 8/2005 |
| WO | WO-2008/047170 | 4/2008 |
| WO | WO-2009/014275 | 1/2009 |
| WO | WO2010/012677 A1 | 2/2010 |
| WO | WO-2012/085572 | 6/2012 |
| WO | WO-2012/147583 | 11/2012 |
| WO | WO-2013/046150 | 4/2013 |
| WO | WO2013/050784 A2 | 4/2013 |
| WO | WO2013/088133 A1 | 6/2013 |
| WO | WO2014/080220 | 5/2014 |

OTHER PUBLICATIONS

Kim, Chang Hwan et al., Strontium-Doped Perovskites Rival Platinum Catalysts for Treating NOx in Stimulated Diesel Exhaust, *Science* vol. 327 No. 5973 Mar. 2010, 1624-1627.
Muntean, George et al., Investigation of Mixed Oxide Catalysts for NO Oxidation, ACE078, *Pacific Northwest National Laboratory* May 17, 2012, 17 pages.
Svetlana, Yashnik A. et al., Dependence of Synergetic Effect of Palladium-Manganese-Hexaaluminate Combustion Catalyst on Nature of Palladium Precursor, *Top Catal.* vol. 55 2012, 818-836.
Wang, Weichao et al., Mixed-Phase Oxide Catalyst Based on Mn-Mullite (Sm, Gc)Mn2O5 for NO Oxidation in Diesel Exhaust, *Science* vol. 337 No. 6096 Aug. 2012, 832-835.
English Language Abst. of KR 20010037201 May 7, 2001.
English Language Abst. of KR 20080103623 Nov. 28, 2008.
International Search Report and written opinion dated Apr. 13, 2015.
Russian Office Action dated Sep. 17, 2018; Russian Patent Application No. 2016129040.

* cited by examiner

MANGANESE-CONTAINING DIESEL OXIDATION CATALYST

TECHNICAL FIELD

The present invention relates to oxidation catalysts that include manganese. More specifically, embodiments are directed to layered catalyst compositions comprising manganese on a refractory metal oxide support, and their use for reducing carbon monoxide and hydrocarbon emissions, for oxidizing nitrogen monoxide to nitrogen dioxide, and for enhancing downstream SCR performance in diesel engine systems.

BACKGROUND

Operation of lean burn engines, for example, diesel engines and lean burn gasoline engines, provide the user with excellent fuel economy and have low emissions of gas phase hydrocarbons and carbon monoxide due to their operation at high air/fuel ratios under fuel lean conditions. Additionally, diesel engines offer significant advantages over gasoline (spark ignition) engines in terms of their fuel economy, durability, and their ability to generate high torque at low speed.

From the standpoint of emissions, however, diesel engines present more severe problems than their spark-ignition counterparts. Because diesel engine exhaust gas is a heterogeneous mixture, emission problems relate to particulate matter (PM), nitrogen oxides ($NO_x$), unburned hydrocarbons (HC), and carbon monoxide (CO).

$NO_x$ is a term used to describe various chemical species of nitrogen oxides, including nitrogen monoxide (NO) and nitrogen dioxide ($NO_2$), among others. NO is of concern because it transforms into $NO_2$ in the upper atmosphere where it is believed to undergo a process known as photochemical smog formation, through a series of reactions in the presence of sunlight and hydrocarbons, and is a significant contributor to acid rain. Ground level $NO_2$, on the other hand, has a high potential as an oxidant and is a strong lung irritant.

Effective abatement of $NO_x$ from lean burn engines is difficult to achieve because high $NO_x$ conversion rates typically require reductant-rich conditions. Conversion of the $NO_x$ component of exhaust streams to innocuous components generally requires specialized $NO_x$ abatement strategies for operation under fuel lean conditions. One of these strategies utilizes selective catalytic reduction (SCR) of $NO_x$, which involves the reaction of $NO_x$ in the presence of a reductant (e.g. urea) over a SCR catalyst, for example vanadia-titania based catalysts or zeolites promoted with a base metal such as Cu, Fe, or other base metals. A performance enhancement can be observed when there is an adequate ratio of $NO_2/NO_x$ in the feed gas to the SCR catalyst, especially in the low temperature range (i.e. <250° C.). Oxidation catalysts comprising a precious metal such as a platinum group metal (PGM) dispersed on a refractory metal oxide support are known for use in treating the exhaust of diesel engines to convert both hydrocarbon and carbon monoxide gaseous pollutants by catalyzing the oxidation of these pollutants to carbon dioxide and water. Such catalysts have been generally contained in units called diesel oxidation catalysts (DOC), which are placed in the exhaust flow path from a diesel-powered engine to treat the exhaust before it vents to the atmosphere. Typically, the diesel oxidation catalysts are formed on ceramic or metallic carrier substrates (such as, e.g. a flow-through monolith carrier), upon which one or more catalyst coating compositions are deposited. In addition to the conversions of gaseous HC, CO, and the soluble organic fraction (SOF) of particulate matter, oxidation catalysts that contain platinum group metals (which are typically dispersed on a refractory oxide support) promote the oxidation of nitric oxide (NO) to $NO_2$.

Catalysts used to treat the exhaust of internal combustion engines are less effective during periods of relatively low temperature operation, such as the initial cold-start period of engine operation because the engine exhaust is not at a temperature sufficiently high enough for efficient catalytic conversion of noxious components in the exhaust. To this end, it is known in the art to include an adsorbent material, such as a zeolite, as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature.

Oxidation catalysts comprising a platinum group metal (PGM) dispersed on a refractory metal oxide support are known for use in treating exhaust gas emissions from diesel engines. Platinum (Pt) remains the most effective metal for oxidizing CO and HC in a DOC, after high temperature aging under lean conditions and in the presence of fuel sulfur. One of the major advantages of using palladium (Pd) based catalysts is the lower cost of Pd compared to Pt. However, Pd based diesel oxidation catalysts typically show higher light-off temperatures for oxidation of CO and HC, especially when used to treat exhaust containing high levels of sulfur (from high sulfur containing fuels) or when used with HC storage materials. The "light-off" temperature for a specific component is the temperature at which 50% of that component reacts. Pd-containing DOCs may poison the activity of Pt to convert HCs and/or oxidize $NO_x$ and may also make the catalyst more susceptible to sulfur poisoning. These characteristics have typically limited the use of Pd-rich oxidation catalysts in lean burn operations, especially for light duty diesel application where engine temperatures remain below 250° C. for most driving conditions.

There is an ongoing need to provided improved diesel oxidation catalysts. It would be desirable to provide a diesel oxidation catalyst (DOC) that provides enhanced $NO_2$ content of the exhaust gas exiting the DOC. An enhanced $NO_2$ content is desirable to improve downstream $NO_x$ removal, particularly the performance of downstream SCR catalysts. In addition, it would be desirable to provide a diesel oxidation catalyst that lowers the light off temperature of CO.

SUMMARY

A first aspect pertains to an oxidation catalyst composite. In a first embodiment, an oxidation catalyst composite for abatement of exhaust gas emissions from a lean burn engine comprises a carrier substrate having a length, an inlet end, and an outlet end, an oxidation catalyst catalytic material on the carrier, the oxidation catalyst catalytic material including a first washcoat layer comprising a first refractory metal oxide support, a platinum (Pt) component and a palladium (Pd) component in a ratio of Pt to Pd in the range of about 10:1 to 1:10; and a second washcoat layer comprising a second refractory metal oxide support containing Mn, a zeolite, a Pt component, and optionally a Pd component. The oxidation catalyst composite is effective to abate hydrocarbon and carbon monoxide, and to oxidize NO to $NO_2$ in a lean burn engine exhaust.

In a second embodiment, the oxidation catalyst composite of the first embodiment is modified wherein the second washcoat layer further comprises a palladium component, and the Pt:Pd ratio of the second washcoat layer is in the range of 1:0 to 10:1.

In a third embodiment, the oxidation catalyst composite of the first and second embodiments is modified, wherein the second washcoat layer is substantially free of palladium.

In a fourth embodiment, the oxidation catalyst composite of the second embodiment is modified, wherein the second layer palladium component is present in an amount in the range of about 0.1 g/ft$^3$ to about 10 g/ft$^3$.

In a fifth embodiment, the oxidation catalyst composite of the first through fourth embodiments is modified, wherein the first washcoat layer is coated on the carrier substrate, and the second washcoat layer is coated on top of the first washcoat layer.

In a sixth embodiment, the oxidation catalyst composite of the first through fifth embodiments is modified, wherein the second refractory metal oxide support contains Mn, wherein the Mn content is in the range of 0.1% to 30% by weight.

In a seventh embodiment, the oxidation catalyst composite of the first through sixth embodiments is modified, wherein the Mn content is in the range of 3 to 10% by weight.

In an eighth embodiment, the oxidation catalyst composite of the sixth and seventh embodiments is modified, wherein the Mn is present in a form selected from the group consisting of a Mn-containing solid solution with the refractory metal oxide, Mn surface dispersed on the refractory metal oxide by impregnation and discrete manganese oxide particles on the refractory metal oxide particles.

In a ninth embodiment, the oxidation catalyst of the sixth through eighth embodiments is modified, wherein the Mn is derived from a soluble Mn species or from bulk Mn oxides.

In a tenth embodiment, the oxidation catalyst composite of the ninth embodiment is modified, wherein the soluble Mn species is selected from the group consisting of Mn acetate, Mn nitrate, Mn sulfate, and combinations thereof.

In an eleventh embodiment, the oxidation catalyst composite of the ninth and tenth embodiments is modified, wherein the bulk Mn oxides are selected from MnO, $Mn_2O_3$, $MnO_2$, and combinations thereof.

In a twelfth embodiment, the oxidation catalyst composite of the sixth through eighth embodiments is modified, wherein the second refractory metal oxide support comprises an oxide of alumina, silica, zirconia, titania, ceria, or combinations thereof.

In a thirteenth embodiment, the oxidation catalyst composite of the first through twelfth embodiments, wherein the second washcoat layer comprises a Pt component in an amount in the range of about 10 g/ft$^3$ to 100 g/ft$^3$.

In a fourteenth embodiment, the oxidation catalyst composite of the thirteenth embodiment is modified, wherein the second washcoat layer further comprises a Pd component in an amount in the range of about 0.1 g/ft$^3$ to 10 g/ft$^3$.

In a fifteenth embodiment, the oxidation catalyst composite of the thirteenth and fourteenth embodiments is modified, wherein the second washcoat layer comprises a hydrothermally stable zeolite in the form of 6 to 12 member ring structures, selected from ZSM-5, beta, mordenite, Y zeolite, chabazite, ferrierite, or combinations thereof.

In a sixteenth embodiment, the oxidation catalyst composite of the first through fifteenth embodiments is modified, wherein the first refractory metal oxide support comprises an oxide of alumina, silica, zirconia, titania, ceria, or combinations thereof.

In a seventeenth embodiment, the oxidation catalyst composite of the first through sixteenth embodiments is modified, wherein the first washcoat layer comprises a Pt component in an amount in the range of about 10 g/ft$^3$ to 100 g/ft$^3$.

In an eighteenth embodiment, the oxidation catalyst composite of the first through seventeenth embodiments is modified, wherein the first washcoat layer comprises a Pd component in an amount in the range of about 10 g/ft$^3$ to 100 g/ft$^3$.

In a nineteenth embodiment, the oxidation catalyst composite of the first through eighteenth embodiments is modified, wherein the second washcoat layer is substantially free of barium and the first washcoat layer is substantially free of zeolite.

In a twentieth embodiment, the oxidation catalyst composite of the first through nineteenth embodiments is modified, wherein the second washcoat layer is coated on the carrier substrate, and the first washcoat layer is coated on top of the second washcoat layer.

In a twenty-first embodiment, the oxidation catalyst composite of the first through twentieth embodiments is modified, wherein the carrier substrate comprises a flow-through monolith.

In a twenty-second embodiment, the oxidation catalyst composite of the first through twenty-first embodiments is modified, wherein the first washcoat layer and the second washcoat layer are both coated on the carrier.

In a twenty-third embodiment, the oxidation catalyst composite of the sixth through eighth embodiments is modified, wherein the Mn is doped with Fe, Ni, Co, Cu, Ce, Sn, Ir, In, and combinations thereof.

A second aspect of the invention is directed to a method for treating a diesel engine exhaust gas stream. In a twenty-fourth embodiment, the method comprises contacting an exhaust gas stream with the oxidation catalyst composite of the first through twenty-third embodiments.

In a twenty-fifth embodiment, the method of the twenty-fourth embodiment is modified, wherein the method further comprises passing the exhaust gas stream to an SCR catalyst composition immediately downstream from the oxidation catalyst.

In a twenty-sixth embodiment, the method of the twenty-fourth and twenty-fifth embodiments is modified, wherein the SCR catalyst composition is disposed on a wall flow filter monolith.

A third aspect of the invention is directed to a system for treatment of a lean burn engine exhaust gas stream including hydrocarbons, carbon monoxide, and other exhaust components, In a twenty-seventh embodiment, the system comprises an exhaust conduit in fluid communication with the lean burn engine via an exhaust manifold; the oxidation catalyst composite of the first through twenty-third embodiment, wherein the carrier substrate is a flow through substrate; and a catalyzed soot filter and an SCR catalyst located downstream from the oxidation catalyst.

In a twenty-eighth embodiment, the system of the twenty-seventh embodiment is modified, wherein the Mn-containing oxidation catalyst of the first through twenty-third embodiments is added to a lean $NO_x$ trap.

In a twenty-ninth embodiment, the system of the twenty-seventh and twenty-eighth embodiments is modified, wherein the lean $NO_x$ trap comprises a barium component and a rhodium component.

In a thirtieth embodiment, the system of the twenty-seventh through twenty-ninth embodiments is modified, wherein a SCR catalyst is coated onto the catalyzed soot filter.

In a thirty-first embodiment, the system of the twenty-seventh through thirtieth embodiments is modified, wherein the SCR catalyst is on a flow through substrate immediately downstream from the oxidation catalyst and the catalyzed soot filter is downstream from the SCR catalyst.

DETAILED DESCRIPTION

Figure 1:
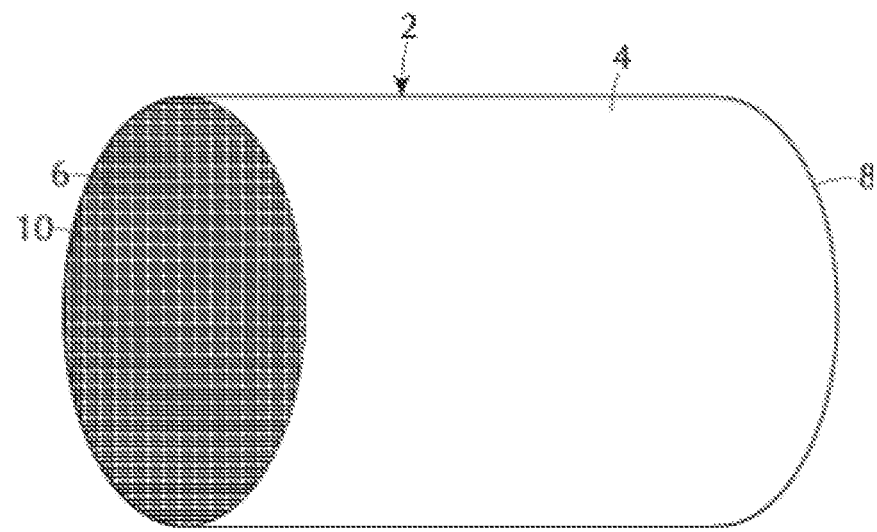
FIG. 1 is a perspective view of a honeycomb-type refractory carrier member which may comprise oxidation catalyst composites in accordance with one or more embodiments.

Before describing several exemplary embodiments of the invention, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as disclosed.

According to embodiments of the invention, it has been determined that incorporating manganese into a refractory metal oxide support provides an oxidation catalyst that enhances the $NO_2$ content of the exhaust gas exiting the DOC and potentially the filter as well, thus improving a downstream SCR reaction. In one or more embodiments, the oxidation catalyst generates sufficient $NO_2$ for low temperature SCR of $NO_x$ over a SCR catalyst component located immediately downstream from the oxidation catalyst. As used herein, "downstream" does not preclude there being an intervening catalyst between the oxidation catalyst and the SCR catalyst. Of course, a reductant injector will be located upstream from the SCR catalyst, and according to one or more embodiments, immediately upstream from the SCR catalyst. The reductant is typically a nitrogenous reductant such as ammonia or an ammonia precursor such as urea or a urea solution. According to one or more embodiments, other functions of the diesel oxidation catalyst are improved, such as lowering CO and HC light off.

As is known in the art, SCR of $NO_x$ in the presence of ammonia includes the following reactions:

$$4NH_3+4NO+O_2 \rightarrow 4N_2+6H_2O \text{ (standard SCR reaction)} \quad (1)$$

$$4NH_3+2NO+2NO_2 \rightarrow 4N_2+6H_2O \text{ (fast SCR reaction)} \quad (2)$$

$$4NH_3+3NO_2 \rightarrow 3.5N_2+6H_2O \text{ (slow } NO_2\text{-SCR reaction)} \quad (3).$$

Reaction "(2)" is referred to as the fast SCR reaction. Applicants have determined that when a SCR catalyst is immediately downstream from the diesel oxidation catalyst, for example, when a SCR catalyst is on a filter, or when the SCR catalyst is on a flow through substrate downstream from the DOC, hydrocarbons tend to inhibit the fast SCR reaction. In addition, at low temperatures, for example, between 150° C. and 300° C., or between 150° C. and 250° C., conventional diesel oxidation catalysts do not provide sufficient $NO_2$ to promote SCR of $NO_x$ at temperatures below 300° C. and 250° C. The diesel oxidation catalyst according to one or more embodiments of the invention promotes SCR of $NO_x$ at low temperatures, for example below 300° C., and in some embodiments below 250° C. In one or more embodiments, the diesel oxidation catalyst traps HC, preventing the HC from inhibiting the fast SCR reaction at the SCR catalyst downstream from the diesel oxidation catalyst.

According to one or more embodiments, an oxidation catalyst composite comprises a carrier substrate having a length, an inlet end and an outlet end, an oxidation catalyst catalytic material on the carrier substrate, the oxidation catalyst catalytic material including a first washcoat layer comprising a first refractory metal oxide support and a Pt component and a Pd component, and a second washcoat layer comprising a second refractory metal oxide support containing Mn, a zeolite, and a Pt component. In one or more embodiments, the oxidation catalyst composite is effective to abate hydrocarbon and carbon monoxide, and to oxidize NO to $NO_2$ in a lean burn engine exhaust.

With respect to the terms used in this disclosure, the following definitions are provided.

As used herein, the term "catalyst composite" refers to a catalytic article including a carrier substrate, for example a honeycomb substrate, having one or more washcoat layers containing a catalytic component, for example, a PGM component that is effective to catalyze oxidation of CO, HC, and NO.

As used herein, the term "washcoat" has its usual meaning in the art of a thin, adherent coating of a catalytic or other material applied to a carrier substrate material, such as a honeycomb-type carrier member, which is sufficiently porous to permit the passage of the gas stream being treated. As is understood in the art, a washcoat is obtained from a dispersion of particles in slurry, which is applied to a substrate, dried and calcined to provide the porous washcoat.

As used herein, the terms "refractory metal oxide support" and "support" refer to the underlying high surface area material upon which additional chemical compounds or elements are carried. The support particles have pores larger than 20 Å and a wide pore distribution. As defined herein, such metal oxide supports exclude molecular sieves, specifically, zeolites. In particular embodiments, high surface area refractory metal oxide supports can be utilized, e.g., alumina support materials, also referred to as "gamma alumina" or "activated alumina," which typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina, silica, titania, and other materials are known for such use. One or more embodiments of the present invention include a refractory metal oxide support comprising an activated compound selected from the group consisting of alumina, zirconia, silica, titania, ceria, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, or zirconia-titania, or combinations thereof. Although many of these materials suffer from the disadvantage of having a considerably lower BET surface area than activated alumina, that disadvantage tends to be offset by a greater durability or performance enhancement of the resulting catalyst. As used herein, the term "BET surface area" has its usual meaning of referring to the Brunauer, Emmett, Teller method for determining surface area by $N_2$ adsorption. Pore diameter and pore volume can also be determined using BET-type $N_2$ adsorption or desorption experiments.

In one or more embodiments, the first washcoat layer comprises a first refractory metal oxide support comprising an oxide of alumina, silica, zirconia, titania, ceria, or combinations thereof. In specific embodiments, the first washcoat layer comprises alumina, more specifically, gamma alumina or activate alumina, having a BET surface area of from 60 to 300 m$^2$/g, including 60, 70, 80, 90, 100, 150, 180, 200, 250, and 300 m$^2$/g.

According to one or more embodiments, the second washcoat layer comprises a second refractory metal oxide support containing manganese (Mn) oxide. In one or more embodiments, the Mn content is in the range of 0.1% to 20% (including 0.1, 0.5, 1.0, 1.5, 2.0, 2.5, 3.0, 4.0, 5.0, 6.0, 7.0, 8.0, 9.0, 10.0, 15.0, and 20.0%) by weight, based on the weight of the second refractory metal oxide support. In specific embodiments, the Mn content is in the range of 3 to 10% by weight.

Without intending to be bound by theory, it is thought that the Mn on alumina in its claimed form is neutral to sulfur poisoning. In other words, Mn will not change the sulfur resistance of the host. As used herein, the terms "sulfur aging" or "sulfur tolerance" or "sulfur resistance" refer to the capability of an oxidation catalyst to oxidize NO, CO, and HC, which is contained in the exhaust gas, also after the influence of sulfur oxides ($SO_x$). The Mn can be incorporated into the refractory metal oxide support in either bulk form or surface forms, or as discrete manganese oxide forms. In one or more embodiments, the Mn is derived from a soluble Mn species selected from Mn acetate, Mn, nitrate, Mn sulfate, or combinations thereof. In other embodiments, the Mn is derived from bulk Mn oxides selected from MnO, $Mn_2O_3$, $MnO_2$, and combinations thereof.

According to one or more embodiments, a refractory metal oxide support is impregnated with a Mn salt. As used herein, the term "impregnated" means that a Mn-containing solution is put into pores of a material such as a zeolite or a refractory metal oxide support. In detailed embodiments, impregnation of metals is achieved by incipient wetness, where a volume of diluted Mn-containing solution is approximately equal to the pore volume of the support bodies. Incipient wetness impregnation generally leads to a substantially uniform distribution of the solution of the precursor throughout the pore system of the material. Other methods of adding metals are also known in the art and can be used.

Thus, according to one or more embodiments, a refractory metal oxide support is treated with a solution of Mn dropwise, in a planetary mixer to impregnate the source with Mn. In other embodiments, a refractory metal oxide support containing Mn can be obtained from commercial sources. In specific embodiments, the second washcoat layer comprises a Mn/alumina refractory metal oxide support, a zeolite, and a Pt component.

The manganese can be included with the refractory oxide support by co-precipitating manganese and the refractory oxide support precursor, and then calcining the co-precipitated material so that the refractory oxide support material and the manganese are in solid solution together. Thus, according to one or more embodiments, mixed oxides containing oxides of manganese, aluminum, cerium, silicon, zirconium and titanium can be formed.

The manganese can also be dispersed on the surface of the refractory oxide support as discrete manganese oxide particles.

In one or more embodiments, the Mn can be doped with one or more metals selected from Fe, Ni, Co, Cu, Ce, Sn, Ir, and In. It will be appreciated that in such cases when the Mn is doped with one or more metals, a mixed oxide can form.

Without intending to be bound by theory, it is thought that manganese interacts beneficially with platinum. In one or more embodiments, the combination of manganese and platinum, wherein platinum is supported on a manganese containing support, results in a synergistic effect to improve NO oxidation. It has been determined that oxidation catalysts comprising manganese without Pt have very low NO oxidation activity, in contrast to existing patent literature that implies substantial activity from Mn alone. However, according to one or more embodiments, an unexpected synergy has been found whereby manganese promotes platinum, providing an oxidation catalyst composite comprising a combination of manganese and platinum that provides a more effective catalyst than a catalyst based on platinum alone.

As used herein, the term "platinum group metal" or "PGM" refers to one or more chemical elements defined in the Periodic Table of Elements, including platinum (Pt), palladium (Pd), rhodium (Rh), osmium (Os), iridium (Ir), ruthenium (Ru), and mixtures thereof. In one or more embodiments, the platinum group metal is selected from the group consisting of platinum and palladium, and mixtures thereof. In other embodiments, rhodium can be added to one or more of the washcoat layers.

The ratio of platinum to palladium in the first washcoat layer can be varied over a wide range. Generally, there are no specific restrictions as far as the platinum to palladium weight ratio of the first washcoat layer is concerned. In one or more embodiments, the platinum to palladium weight ratio of the first washcoat layer is in the range of from about 10:1 to 1:10, including 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, and 1:10. The loading for the PGM in the first washcoat layer can be in the range of about 10 g/ft$^3$ to 200 g/ft$^3$. Generally, there are no specific restrictions as far as the palladium content of the first washcoat layer is concerned. There are also no specific restrictions as far as the platinum content of the first washcoat layer is concerned. In specific embodiments, the loading of Pt in the first washcoat layer is in the range of about 10 g/ft$^3$ to 100 g/ft$^3$, and the loading of Pd in the first washcoat layer is in the range of about 10 g/ft$^3$ to 100 g/ft$^3$.

Therefore, in one or more embodiments, the oxidation catalyst composite comprises a carrier substrate having a length, an inlet end and an outlet end, an oxidation catalyst catalytic material on the carrier substrate, the oxidation catalyst catalytic material including a first washcoat layer comprising a first refractory metal oxide support and a Pt component and a Pd component in a ration of Pt:Pd in the range of about 10:1 to 1:10, and a second washcoat layer comprising a second refractory metal oxide support containing Mn, a zeolite, and a Pt component. In one or more embodiments, the second washcoat layer optionally comprises a Pd component such that there is a Pt:Pd ratio of 1:0 to 10:1. Generally, there are no specific restrictions as far as the total content of platinum of the second washcoat layer. In one or more embodiments, the loading of Pt in the second washcoat layer is in the range of about 10 g/ft$^3$ to 100 g/ft$^3$, and the loading of Pd in the second washcoat layer is in the range of about 0.1 g/ft$^3$ to 10 g/ft$^3$. In such embodiments, Pd is added at low levels to the Pt-containing second washcoat in an amount of not more than 10% of Pd by weight of PGM in the second washcoat layer. In specific embodiments, there is less than about 10% by weight of Pd, including less than about 9%, 8%, 7%, 6%, 5%, 4%, 3%, 2%, and 1% by weight of Pd.

According to one or more embodiments, an adsorbent material, which may be a zeolite, may be included as part of a catalyst composite in order to adsorb gaseous pollutants, usually hydrocarbons, and retain them during the initial cold-start period. As the exhaust temperature increases, the adsorbed hydrocarbons are driven from the adsorbent and subjected to catalytic treatment at the higher temperature. Thus, in one or more embodiments, the second washcoat layer comprises a hydrocarbon storage compound, such as a zeolite. As used herein, the term "molecular sieves", such as zeolites, refer to materials, which may in particulate form support catalytic precious group metals, the materials having a substantially uniform pore distribution, with the average pore size being no larger than 20 Å.

Typically, any structure types of zeolites/aluminosilicates can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

The zeolite can be a natural or synthetic zeolite such as faujasite, chabazite, clinoptilolite, mordenite, silicalite, zeolite X, zeolite Y, ultrastable zeolite Y, ZSM-5, ZSM-12, SSZ-3, SAPO 5, offretite, or a beta zeolite. In specific embodiments, zeolite materials have a high silica to alumina ratio. The zeolites may have a silica:alumina molar ratio of from at least 25:1, specifically at least 50:1, with useful ranges of from 25:1 to 1000:1, 50:1 to 500:1 as well as 25:1 to 300:1, from 100:1 to 250:1, or alternatively from 35:1 to 180:1 is also exemplified. Specific examples of zeolites include ZSM-5, Y, and beta zeolites.

In one or more embodiments, the second washcoat layer comprises a hydrothermally stable zeolite in the form of 6 to 12 member ring structures selected from ZSM-5, beta zeolite, mordenite, Y zeolite, chabazite, ferrierite, or combinations thereof. In a specific embodiment, the second washcoat layer comprises beta zeolite. The second washcoat layer comprises a zeolite in a total amount of from 0.1 to 1 g/in$^3$, including 0.3 to 0.8 g/in$^3$. In a specific embodiment, the second washcoat layer comprises a zeolite in a total amount of about 0.5 g/in$^3$.

In one or more embodiments, the first washcoat layer is substantially free of zeolite. As used herein, the term "substantially free of zeolite" means that there is no zeolite intentionally added to the first washcoat layer, and that there is less than about 5% of zeolite by weight in the first washcoat layer.

In one or more embodiments, platinum is concentrated into the top washcoat layer to enhance NO oxidation. Thus, according to one or more embodiments, an oxidation catalyst composite is provided comprising a first washcoat layer coated on a carrier substrate, the first washcoat layer comprising a first refractory metal oxide support, a platinum (Pt) component and a palladium (Pd) component in a ratio of Pt to Pd in the range of about 10:1 to 1:10; and a second washcoat layer coated over (on top) the first washcoat layer, the second washcoat layer comprising a second refractory metal oxide support containing Mn, a zeolite, and a Pt component, wherein at least 50%, including 50, 55, 60, 65, 70, 75, 80, 85, 90, 95, and 99%, of the platinum is concentrated into the second washcoat layer.

Each of the layers of the oxidation catalyst composite according to the present invention is formed from a washcoat composition that contains the respective support material as described above. Other additives such as binders and stabilizers can also be included in the washcoat composition. As disclosed in U.S. Pat. No. 4,727,052, porous support materials, such as activated alumina, can be thermally stabilized to retard undesirable alumina phase transformations from gamma to alpha at elevated temperatures. Stabilizers can be selected from alkaline earth metal components selected from the group consisting of magnesium, barium, calcium and strontium. When present, stabilizer materials are added at from about 0.01 g/in$^3$ to 0.15 g/in$^3$ in the coating.

In one or more embodiments, the first washcoat layer can further comprise an alkaline earth metal selected from Mg, Ca, Sr, or Ba. In a specific embodiment, the first washcoat zone further comprises Ba. The alkaline earth can be present in an amount of from about 20 g/ft$^3$ to about 120 g/ft$^3$ (including 20, 30, 40, 50, 60, 70, 80, 90, 100, 110, and 120 g/ft$^3$).

In one or more embodiments, the second washcoat layer is substantially free of an alkaline earth metal. In specific embodiments, the second washcoat layer is substantially free of barium. As used herein, the term "substantially free of barium" means that there is no barium intentionally added to the second washcoat layer, and that there is less than about 5% of barium by weight in the second washcoat layer. It is appreciated, however, by one of skill in the art that during loading some barium present in the first washcoat layer can migrate to the second washcoat layer, such that a trace amount of barium may be present in the second washcoat layer. In specific embodiments, there is less than about 5% by weight of barium, including less than about 4%, 3%, 2%, and 1% by weight of barium in the second washcoat layer.

According to one or more embodiments, the oxidation catalyst composite can further comprise an undercoat layer located between the carrier substrate and the first washcoat layer. In one or more embodiments, the undercoat layer comprises alumina, specifically gamma-alumina. In embodiments, where the undercoat layer is present, the undercoat layer is coated over the carrier substrate, and then the first washcoat layer can be coated over (on top) of the undercoat layer. In one or more embodiments, the undercoat layer can comprise one or more platinum group metals and/or zeolite.

In one or more embodiments, the oxidation catalyst including the first and second washcoat layers is then applied to a ceramic or metallic flow-through monolith, or a wall flow filter. As used herein, the term "washcoat layer" is used to denote the location of the diesel oxidation catalyst on the carrier substrate. It will be appreciated that there is no particular order to the layering of the washcoats. In one or more embodiments, the first washcoat layer is coated on the carrier substrate, and the second washcoat layer is then coated on top (or over) the first washcoat layer. In other embodiments, the second washcoat layer is coated on the carrier substrate, and the first washcoat layer is coated on top (or over) the second washcoat layer. In still further embodiments, both the first washcoat layer and the second washcoat layer are coated on the carrier substrate, such that one washcoat is upstream and the other washcoat is downstream and there is a single layer on the carrier substrate.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a lean burn engine, which may contain entrained non-gaseous components such as liquid droplets, solid particulates, and the like. The exhaust gas stream of a lean burn engine typically further comprises combustion products, products of incomplete combustion, oxides of nitrogen, combustible and/or carbonaceous particulate matter (soot), and un-reacted oxygen and nitrogen.

The Carrier Substrate

As used herein, the terms "carrier" and "substrate" refer to the monolithic material onto which the refractory metal oxide support is placed, typically in the form of a washcoat containing a plurality of supports having catalytic species thereon. According to one or more embodiments, the substrate may be any of those materials typically used for preparing DOC catalysts and will typically comprise a metal or ceramic honeycomb structure. Any suitable substrate may be employed, such as a monolithic substrate of the type having a plurality of fine, parallel gas flow passages extending therethrough from an inlet or an outlet face of the substrate, such that passages are open to fluid flow therethrough. The passages, which are essentially straight paths from their fluid inlet to their fluid outlet, are defined by walls in which the catalytic material is coated as a "washcoat" so that the gases flowing through the passages contact the catalytic material. A washcoat is formed by preparing a slurry containing a specified solids content (e.g., 30-50% by weight) of supports in a liquid medium, which is then coated onto a carrier substrate and dried to provide a washcoat layer.

The flow passages of the monolithic substrate are thin-walled channels which can be of any suitable cross-sectional shape and size such as trapezoidal, rectangular, square, sinusoidal, hexagonal, oval, circular, etc. Such structures may contain from about 60 to about 600 or more gas inlet openings (i.e., "cells") per square inch of cross section.

The ceramic substrate may be made of any suitable refractory material, e.g., cordierite, cordierite-α alumina, silicon nitride, silicon carbide, zircon mullite, spodumene, alumina-silica magnesia, zircon silicate, sillimanite, magnesium silicates, zircon, petalite, α-alumina, aluminosilicates and the like.

The substrates useful for the layered oxidation catalyst composites according to one or more embodiments may also be metallic in nature and may be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component.

Preparation of Catalyst Composites

The oxidation catalyst composites according to one or more embodiments may be formed in a single layer or in multiple layers. In some circumstances, it may be suitable to prepare one slurry of catalytic material and use this slurry to form multiple layers on the substrate. The catalyst composites can be prepared by known processes, e.g. incipient wetness. A representative process is set forth below.

The catalyst composite can be prepared in layers on a monolith substrate. For a first layer of a specific washcoat, finely divided particles of a high surface area refractory metal oxide such as gamma alumina are slurried in an appropriate vehicle, e.g. water. The substrate may then be dipped one or more times in such slurry or the slurry may be coated on the substrate such that there will be deposited on the substrate the desired loading of the metal oxide. To incorporate components such as precious metals (e.g. palladium, platinum, rhodium, and/or combinations) and stabilizers and/or promoters, such components may be incorporated in the slurry prior to substrate coating as a mixture of water soluble or water-dispersible compounds or complexes. Thereafter, the coated substrate is calcined by heating, e.g., at 400-600° C. for about 10 minutes to about 4 hours. When platinum and/or palladium are desired, the platinum and palladium component are used in the form of compounds or complexes to achieve dispersion of the components on the refractory metal oxide support, e.g. activated alumina. As used herein, the term "platinum component" and "palladium component" refer to any compound, complex, or the like which, upon calcinations or use thereof, decomposes or otherwise converts to a catalytically active form, usually the metal or the metal oxide. Generally, aqueous solutions of soluble compounds or complexes of the precious metals are used. Non-limiting examples of suitable compounds include palladium nitrate, tetraammine palladium nitrate, platinum chloride, tetraammine platinum acetate, and platinum nitrate. During the calcination steps, or at least during the initial phase of use of the composite, such compounds are converted into a catalytically active form of the metal or a compound thereof.

A suitable method of preparing any layer of the layered catalyst composite is to prepare a mixture of a solution of a desired precious metal compounds (e.g., platinum compound and/or a palladium compound) and at least one support, such as a finely divided, high surface area, refractory metal oxide support, e.g., gamma alumina, which is sufficiently dry to absorb substantially all of the solution to form a wet solid which is later combined with water to form a coatable slurry. In one or more embodiments, the slurry is acidic, having, for example, a pH of about 2 to less than about 7. The pH of the slurry may be lowered by the addition of an adequate amount of an inorganic acid or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds and/or stabilizers, e.g., barium acetate, and a promoter, e.g., lanthanum nitrate, may be added to the slurry.

In one or more embodiments, the slurry is pulverized to result in substantially all of the solids having particle sizes of less than 18 micron. The pulverization may be accomplished in a ball mill or other similar equipment, and the solids content of the slurry may be, e.g., about 20-60 wt % or 30-40 wt %.

Additional layers, i.e., second layer may be prepared and deposited upon the first layer in the same manner as described for the deposition of the first layer upon the substrate.

Figure 2:
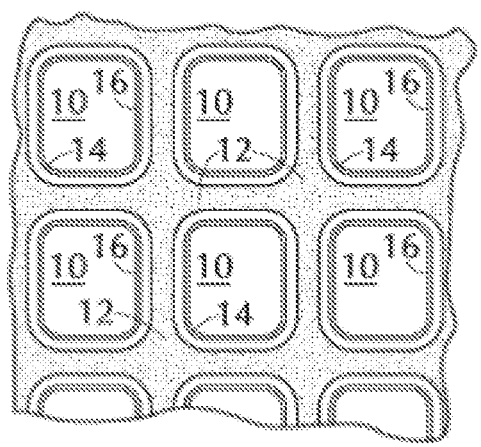
FIG. 2 is a partial cross-sectional view enlarged relative to FIG. 1, which shows an enlarged view of one of the gas flow passages shown in FIG. 1.

The catalyst composite according to one or more embodiments may be more readily appreciated by references to FIGS. 1 and 2. FIGS. 1 and 2 show a refractory substrate member 2, in accordance with one or more embodiments. Referring to FIG. 1, the refractory substrate member 2 is a cylindrical shape having a cylindrical outer surface 4, an upstream end face 6 and a downstream end face 8, which is identical to end face 6. Substrate member 2 has a plurality of fine, parallel gas flow passages 10 formed therein. As see in FIG. 2, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As is more easily seen in FIG. 2, walls 12 are so dimensioned and configured that gas flow passages 10 have a substantially regular polygonal shape, substantially square in the illustrated embodiment, but with rounded corners in accorded with U.S. Pat. No. 4,335,023. A first washcoat layer 14 is adhered to or coated onto the walls 12 of the substrate member. As shown in FIG. 2, a second washcoat layer 16 is coated over the first washcoat layer 14. In one or more embodiments, an undercoat (not shown) can be applied to the substrate beneath the first washcoat layer 14.

As shown in FIG. 2, the substrate member 2 includes void spaces provided by the gas-flow passages 10, and the cross-sectional area of these passages 10 and the thickness of the walls 12 defining the passages will vary from one type of substrate member to another. Similarly, the weight of washcoat applied to such substrates will vary from case to case. Consequently, in describing the quantity of washcoat or catalytic metal component or other component of the composition, it is convenient to use units of weight of component per unit volume of catalyst substrate. Therefore, the units grams per cubic inch ("g/in$^3$") and grams per cubic foot ("g/ft$^3$") are used herein to mean the weight of a component per volume of substrate member, including the volume of void spaces of the substrate member.

Figure 3:
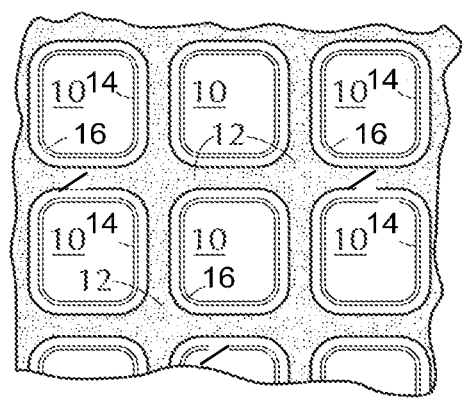
FIG. 3 is a partial cross-sectional view enlarged relative to FIG. 1, which shows an enlarged view of one of the gas flow passages shown in FIG. 1.

In other embodiments, as shown in FIG. 3, a second washcoat layer 16 is adhered to or coated onto the walls 12 of the substrate member. A first washcoat layer 14 is then coated over or on top of the second washcoat layer 16. As used herein, "over" and "on top of" means that there is no intervening layer between the first and second washcoat layer and the second layer is directly on the first layer. In one or more embodiments, an undercoat (not shown) can be applied to the substrate beneath the second washcoat layer 16.

In another embodiment, the washcoat layers may be coated such that the washcoats form a single layer coated over the substrate. In some circumstances, the washcoat layers may be zone coated such that the first washcoat layer is on the upstream end, and the second washcoat layer is on the downstream end of the substrate. For example, an upstream or first washcoat layer can be coated over a portion of the upstream region of the substrate, and a downstream or second washcoat zone can be coated over a portion of the downstream region of the substrate.

Figure 4:
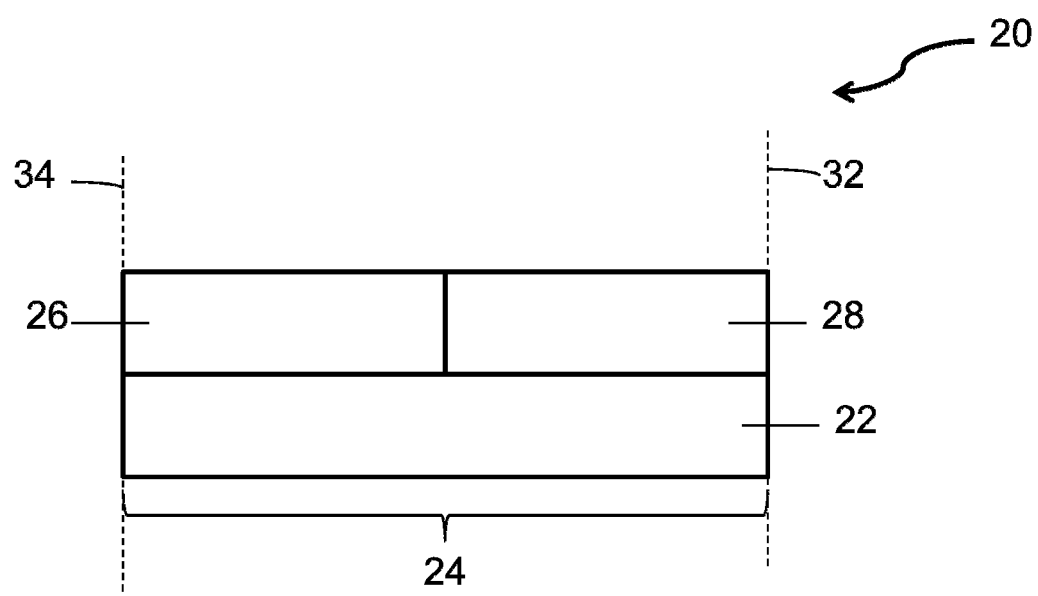
FIG. 4 shows a cross-sectional view of oxidation catalyst composites according to various embodiments.

The catalyst composite embodiments including the first washcoat layer and the second washcoat layer may be more easily understood by reference to FIG. 4. FIG. 4 shows an embodiment of a zoned oxidation catalyst composite 20 for abatement of exhaust gas emissions from a diesel engine. A substrate 22, for example, a honeycomb monolith, having a length 24 and an inlet or upstream end 34 and an outlet or downstream end 32 contains two separate coated washcoat zones. The first washcoat zone 26 is located adjacent to the upstream or inlet end 34 of the substrate 22 and comprises a first washcoat layer comprising a first refractory metal oxide support, a platinum (Pt) component and a palladium (Pd) component in a ratio of Pt to Pd in the range of about 10:1 to 1:10. A second washcoat zone 28 is located adjacent to the outlet or downstream end 32 and comprises a second refractory metal oxide support containing Mn, a zeolite, and a Pt component. The second washcoat layer can optionally comprise palladium.

In other embodiments, the first washcoat zone 26 is located adjacent to the upstream or inlet end 34 of the substrate 22 and comprises a second washcoat layer comprising a second refractory metal oxide support containing Mn, a zeolite, and a Pt component, the second washcoat layer being substantially free of palladium a first refractory metal oxide support. A second washcoat zone 28 is located adjacent to the outlet or downstream end 32 and comprises a a first washcoat layer comprising platinum (Pt) component and a palladium (Pd) component in a ratio of Pt to Pd in the range of about 10:1 to 1:10.

The oxidation catalyst composite can be used in an integrated emission treatment system comprising one or more additional components for the treatment of diesel exhaust gas emissions. Thus, embodiments of a second aspect of the invention are directed to systems for treating a gaseous exhaust stream from a diesel engine. The systems comprises the layered oxidation catalyst composite of the present invention, an exhaust conduit in fluid communication with the diesel engine via an exhaust manifold, and one or more of the following in fluid communication with the layered oxidation catalyst composite: a catalyzed soot filter (CSF), a selected catalytic reduction (SCR) article, a $NO_x$ storage and reduction (NSR) catalytic article.

In addition to treating the exhaust gas emissions via use of the oxidation catalyst composite according to one or more embodiments, a soot filter for removal of particulate matter may be used. The soot filter may be located upstream or downstream from the oxidation catalyst composite, but, typically, the soot filter will be located downstream from the oxidation catalyst composite. In one or more embodiments, the soot filter is a catalyzed soot filter (CSF). The CSF may comprise a substrate coated with a washcoat layer containing one or more catalysts for burning off trapped soot and/or oxidizing exhaust gas stream emissions. In general, the soot burning catalyst can be any known catalyst for combustion of soot. For example, the CSF can be coated with one or more high surface area refractory oxides (e.g., an aluminum oxide or ceria-zirconia) for the combustion of unburned hydrocarbons and to some degree particulate matter. The soot burning catalyst can be an oxidation catalyst comprising one or more precious metal (PM) catalysts (platinum, palladium, and/or rhodium).

Figure 5:
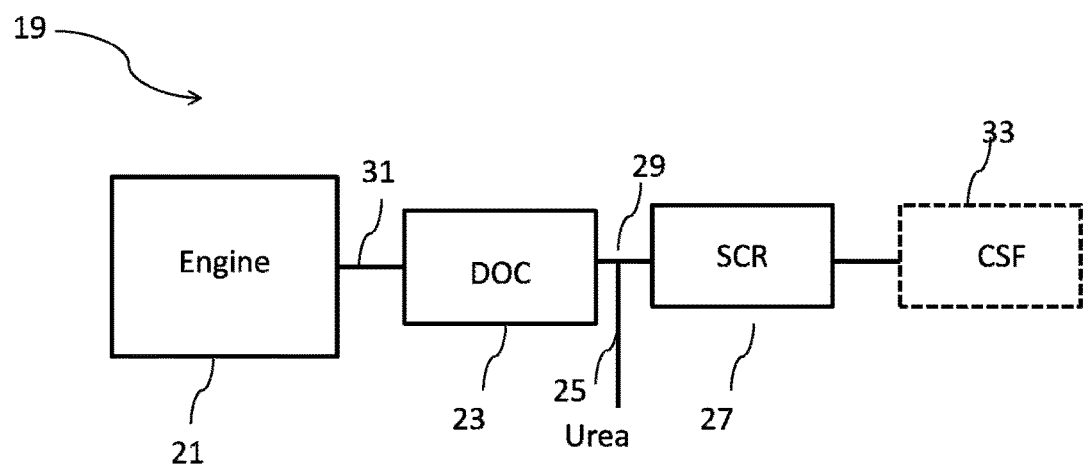
FIG. 5 is a schematic of an engine treatment system according to one or more embodiments.
Figure 6:
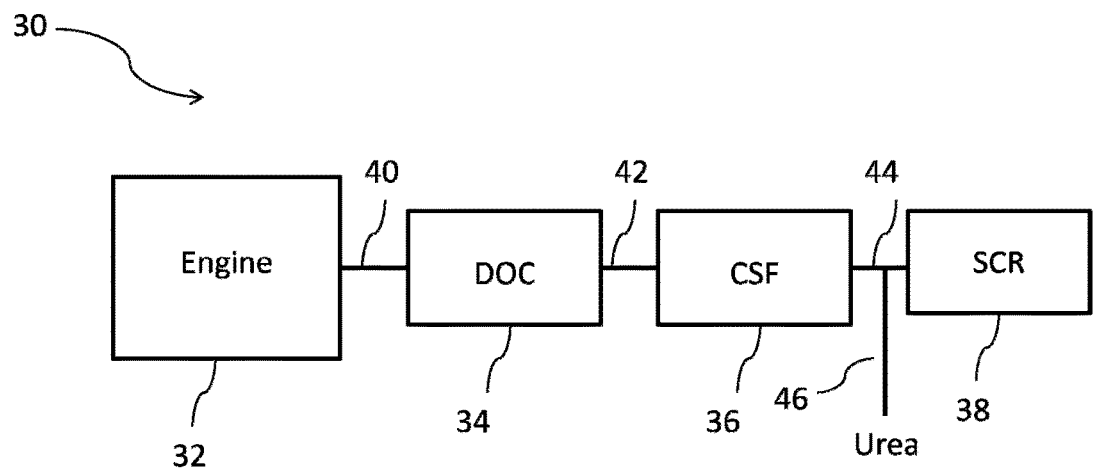
FIG. 6 is a schematic of an engine treatment system according to one or more embodiments.
Figure 7:
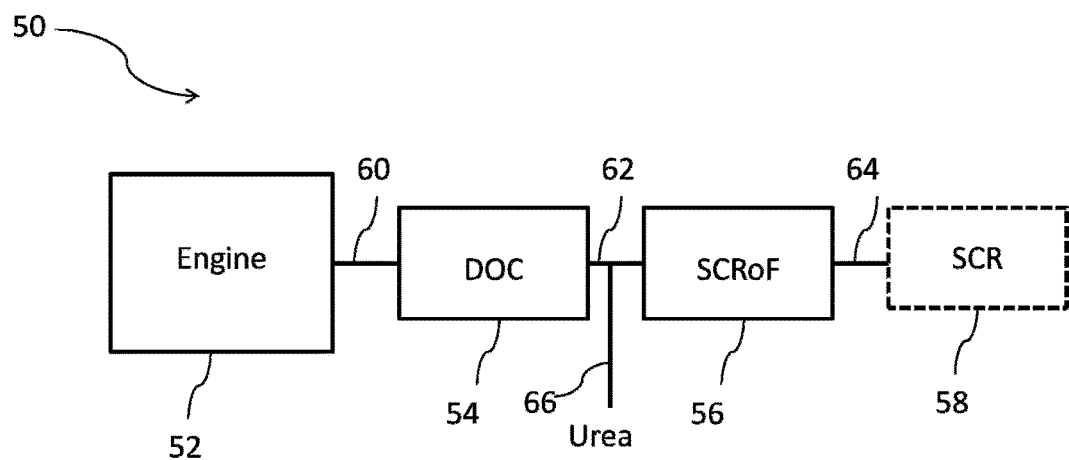
FIG. 7 is a schematic of an engine treatment system according to one or more embodiments.

Exemplary emission treatment systems may be more readily appreciated by reference to FIGS. 5-7, which depict schematic representations of an emission treatment system, in accordance with one or more embodiments of the present invention. In one or more embodiments, the system comprises an exhaust conduit in fluid communication with a diesel engine via an exhaust manifold; the oxidation catalyst composite according to one or more embodiments wherein the substrate is a flow through substrate or a wall-flow substrate, and, optionally, a catalyzed soot filter and an SCR catalyst located downstream from the oxidation catalyst composite. Referring to FIG. 5, in a particular embodiment, the SCR catalyst 27 is located immediately downstream from the oxidation catalyst 23 with no intervening catalyst material between the oxidation catalyst and the SCR catalyst. In a specific embodiment, an optional catalyzed soot filter (CSF) 33 is placed downstream of the SCR catalyst.

In general, any known filter substrate can be used, including, e.g., a honeycomb wall flow filter, wound or packed fiber filter, open-cell foam, sintered metal filter, etc., with wall flow filters being particularly suitable. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches.

Typical wall flow filter substrates are composed of ceramic-like materials such as cordierite, a-alumina, silicon carbide, silicon nitride, zirconia, mullite, spodumene, alumina-silica-magnesia or zirconium silicate, or of porous, refractory metal. Wall flow substrates may also be formed of ceramic fiber composite materials.

In other embodiments, an exemplary emission treatment system may be more readily appreciated by reference to FIG. 6, which depicts a schematic representation of an emission treatment system 30. Referring to FIG. 6, an exhaust gas stream containing gaseous pollutants (e.g., unburned hydrocarbons, carbon monoxide and $NO_x$) and particulate matter is conveyed via an exhaust transfer line 40 from a lean burn engine 32 such as a diesel engine to a diesel oxidation catalyst (DOC) 34, which is in the form of the oxidation catalyst composite according to one or more embodiments of the present invention. In the DOC 34, unburned gaseous and volatile hydrocarbons (i.e., the VOF) and carbon monoxide are largely combusted to form carbon dioxide and water. In addition, a proportion of the NO of the $NO_x$ component may be oxidized to $NO_2$ in the DOC. The exhaust stream is next conveyed via exhaust line 42 to a catalyzed soot filter (CSF) 36, which traps particulate matter present within the exhaust gas stream. The CSF 36 is optionally catalyzed for passive regeneration. After removal of particulate matter, via CSF 36, the exhaust gas stream is conveyed via exhaust line 44. An ammonia precursor (e.g. aqueous urea) is injected via line 46 into the exhaust line 44. The exhaust gas stream with added ammonia is conveyed via line 44 to a downstream selective catalytic reduction (SCR) component 38 for the treatment and/or conversion of $NO_x$.

Another exemplary emission treatment system is shown in FIG. 7, which depicts a schematic representation of an emission treatment system 50. Referring to FIG. 7, an exhaust gas stream containing gaseous pollutants (e.g. unburned hydrocarbons, carbon monoxide and $NO_x$) and particulate matter is conveyed via exhaust line 60 from a lean burn engine 52 such as a diesel engine to a diesel oxidation catalyst (DOC) 54, which is in the form of the oxidation catalyst composite according to embodiments of the present invention. In the DOC 54, unburned gaseous and volatile hydrocarbons (i.e. the VOF) and carbon monoxide are largely combusted to form carbon dioxide and water. In addition, a proportion of the NO of the $NO_x$ component may be oxidized to $NO_2$ in the DOC. The exhaust stream is next conveyed via exhaust line 62. An ammonia precursor (e.g. aqueous urea) is injected via line 66 into the exhaust line 62. The exhaust gas stream with added ammonia is conveyed via line 62 to a selective catalytic reduction component supported within a catalytic soot filter (SCRoF) 56, to trap particulate matter present within the exhaust gas stream and treat and/or convert $NO_x$. Optionally, the exhaust gas stream may be conveyed via line 64 to a downstream selective catalytic reduction (SCR) component 58 for further treatment and/or conversion of $NO_x$.

In these embodiments, a suitable SCR component is located downstream of a soot filter component. A suitable SCR catalyst component for use in the emission treatment system is able to effectively catalyze the reduction of the $NO_x$ component at temperatures below 600° C., so that adequate $NO_x$ levels can be treated even under conditions of low load which typically are associated with lower exhaust temperatures. In an embodiment, the catalyst article is capable of converting at least 50% of the $NO_x$ component to $N_2$, depending on the amount of reductant added to the system. Another desirable attribute for the composition is that it possesses the ability to catalyze the reaction of $O_2$ with any excess $NH_3$ to $N_2$ and $H_2O$, so that $NH_3$ is not emitted to the atmosphere. Useful SCR catalyst compositions used in the emission treatment system should also have thermal resistance to temperatures greater than 650° C. Such high temperatures may be encountered during regeneration of the upstream catalyzed soot filter.

Suitable SCR catalyst compositions are described, for instance, in U.S. Pat. No. 4,961,917 (the '917 patent) and U.S. Pat. No. 5,516,497, which are both hereby incorporated by reference in their entirety. Compositions disclosed in the '917 patent include one or both of an iron and a copper promoter present in a zeolite in an amount of from about 0.1 to 30 percent by weight, specifically from about 1 to 5 percent by weight, of the total weight of promoter plus zeolite. In addition to their ability to catalyze the reduction of $NO_x$ with $NH_3$ to $N_2$, the disclosed compositions can also promote the oxidation of excess $NH_3$ with $O_2$, especially for those compositions having higher promoter concentrations. Other specific SCR compositions that may be used in accordance with one or more embodiments of the invention include 8-ring, small pore molecular sieves, for example, those having the structure type selected from the group consisting of AEI, AFT, AFX, CHA, EAB, ERI, KFI, LEV, SAS, SAT, and SAV. In a specific embodiment, the 8-ring small pore molecular sieve has the CHA structure and is a zeolite. The CHA zeolite may contain copper. Exemplary CHA zeolites have a silica to alumina ratio (SAR) greater than about 15, and copper content exceeding about 0.2 wt %.

In a more specific embodiment, the mole ratio of silica to alumina is from about 15 to about 256, and copper content from about 0.2 wt % to about 5 wt %. Other useful compositions for SCR include nonzeolitic molecular sieves having the CHA crystal structure. For example, silicoaluminophosphates such as SAPO-34, SAPO-44 and SAPO-18 may be used in accordance with one or more embodiments. Other useful SCR catalysts can include a mixed oxide including one or more of $V_2O_5$, $WO_3$ and $TiO_2$.

The system may further include a $NO_x$ storage and release (NSR) catalytic article. In certain embodiments, one or the other or both of an SCR or NSR catalytic article is included in the system.

A third aspect of the invention is directed to methods for treating a diesel exhaust gas stream comprising carbon monoxide, hydrocarbons, and $NO_x$. In one or more embodiments, the method comprises contacting an exhaust gas stream with the oxidation catalyst composite of the present invention.

Embodiments of the invention are now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1: Supported Mn/Alumina Loading Study: Powder Tests

Catalysts N1, N2, N3, N4 and N5 were prepared as follows:

Step 1: A support of 5% $SiO_2/Al_2O_3$ was impregnated with Mn-acetate solution. The slurry was dried at 120° C., followed by calcination at 600° C. for 1 h in air.

Step 2: The calcined powders from step 1 were diluted with water. Alumina binder was added, followed by addition of Pt-amine solution. The pH was adjusted to pH 4.5 using $HNO_3$. The slurries were milled, followed by drying at 120° C., and calcination at 450° C. for 1 h in air. The calcined powders were crushed and sieved to achieve a particle size between 250-500 μM. The catalysts were aged at 800° C. for 16 h, 10% $H_2O$ in air.

Table 1 shows the formulations of Samples N1-N5.

TABLE 1

| Sample | Mn (wt %) | Pt (wt %) |
|--------|-----------|-----------|
| N1 | 0 | 3.5 |
| N2 | 1 | 3.5 |
| N3 | 5 | 3.5 |
| N4 | 10 | 3.5 |
| N5 | 20 | 3.5 |

Testing: 100 mg of sample was diluted to a sample volume of 1 mL (with corundum). Measurement time: 3 min equilibration time plus 30 s sampling time. Temperature (° C.): 120, 125, 135, 150, 165, 180, 195, 210, 225, 250, 300, 350° C.; GHSV: 45000 h$^{-1}$; Feed Composition: 700 ppm CO, 190 ppm-$C_1$ HC (130 ppm from decane, 60 ppm from propylene), 40 ppm NO, 10% $O_2$, 6% $CO_2$, 5% $H_2O$. Two runs of each catalyst were performed, and the data from the second run was used for catalyst ranking.

Sulfur Aging: 350° C., 20 h, 9 L/h 20 ppm $SO_2$, 100 ppm NO, 2000 ppm CO, 440 ppm HC, 5% $H_2O$ in air.

Regeneration: 700° C., 30 min in 10% $H_2O$/air

Table 2 shows the $NO_2$ formation results for Samples N1-N5 at varying temperatures, after aging, before sulfation.

TABLE 2

| | Temp. (° C.) | | | | |
|---|---|---|---|---|---|
| | 195 | 210 | 225 | 250 | 300 |
| N1 | 0.8 | 8.7 | 30.5 | 48.9 | 72.1 |
| N2 | 0.9 | 19.4 | 43.8 | 61.6 | 81.7 |
| N3 | 18.4 | 55.7 | 73.8 | 80.9 | 89.4 |
| N4 | 17.7 | 46.6 | 64.3 | 76.0 | 85.6 |
| N5 | 6.7 | 36.0 | 55.7 | 73.5 | 81.7 |

Table 3 shows the $NO_2$ formation results for Samples N1-N5 at varying temperatures, after sulfation.

TABLE 3

| | Temp. (° C.) | | | | |
|---|---|---|---|---|---|
| | 195 | 210 | 225 | 250 | 300 |
| N1 | 0.6 | 3.1 | 9.4 | 24.3 | 52.0 |
| N2 | 1.0 | 12.9 | 25.1 | 47.9 | 60.9 |
| N3 | 10.2 | 24.8 | 43.1 | 58.9 | 73.0 |
| N4 | 9.0 | 25.6 | 40.1 | 61.0 | 72.2 |
| N5 | 9.2 | 32.0 | 43.8 | 57.9 | 76.8 |

Table 4 shows the $NO_2$ formation results for Samples N1-N5 at varying temperatures, after thermal regeneration.

TABLE 4

| | Temp. (° C.) | | | | |
|---|---|---|---|---|---|
| | 195 | 210 | 225 | 250 | 300 |
| N1 | 6.8 | 17.7 | 33.0 | 51.8 | 61.6 |
| N2 | 12.5 | 22.5 | 40.1 | 56.3 | 70.0 |
| N3 | 22.4 | 32.9 | 45.7 | 58.0 | 71.3 |
| N4 | 32.9 | 44.6 | 63.2 | 76.5 | 75.2 |
| N5 | 29.2 | 43.6 | 56.0 | 69.5 | 71.4 |

As can be seen in Tables 2-4, the Mn-containing DOCs have superior $NO_2$ formation compared to the non-Mn catalyst. In addition, a stabilization effect (better results after 700° C. regeneration) was observed for Mn on Alumina samples (Samples N2-N5).

Example 2: Bulk Mn Oxide, Mn Loading Study: Powder Study

Catalysts N11, N25, N26, and N28 were prepared as follows:

Step 1: A carrier comprising gamma alumina was impregnated with a Pd-nitrate solution. A solution of Pt-amine was added. The pH was adjusted to pH 4.5 with $HNO_3$. The slurry was dried at 120° C., and calcined at 600° C. for 1 h in air.

Step 2: The calcined powders from step 1 were mixed with high surface area $MnO_2$ (BET Surface Area: 162 m$^2$/g). Water and alumina binder was added, followed by ball milling, drying at 120° C. and calcinations at 600° C. for 1 h in air. The calcined powders were crushed and sieved to achieve a particle size between 250-500 μM. The catalysts were aged at 800° C. for 16 h, 10% $H_2O$ in air.

Table 5 shows the formulation of Samples N11, N25, N26, and N28

TABLE 5

| Sample | Mn (wt %) | Mn source | Pt (wt %) | Pd(wt %) |
|---|---|---|---|---|
| N11 | 0 | — | 3.28 | 0.22 |
| N25 | 5 | $MnO_2$ | 3.28 | 0.22 |
| N26 | 10 | $MnO_2$ | 3.28 | 0.22 |
| N28 | 20 | $MnO_2$ | 3.28 | 0.22 |

Testing was performed according to Example 1. Table 6 shows the $NO_2$ formation results for Samples N11, N25, N26, and N28 at varying temperatures, before sulfation.

TABLE 6

| | Temp. (° C.) | | | | |
|---|---|---|---|---|---|
| | 195 | 210 | 225 | 250 | 300 |
| N11 | 24.7 | 46.7 | 62.4 | 80.6 | 86.5 |
| N25 | 27.3 | 42.2 | 59.4 | 72.4 | 78.1 |
| N26 | 25.5 | 46.3 | 59.8 | 77.6 | 80.0 |
| N28 | 35.5 | 52.5 | 60.9 | 72.8 | 82.7 |

Table 7 shows the $NO_2$ formation results for Samples N11, N25, N26, and N28 at varying temperatures, after sulfation.

TABLE 7

| | Temp. (° C.) | | | | |
|---|---|---|---|---|---|
| | 195 | 210 | 225 | 250 | 300 |
| N11 | 0.1 | 1.9 | 3.9 | 17.4 | 45.5 |
| N25 | 0.4 | 2.6 | 1.5 | 20.1 | 47.2 |
| N26 | 2.6 | 3.2 | 11.8 | 30.0 | 54.0 |
| N28 | 11.5 | 22.1 | 33.1 | 49.1 | 63.5 |

Table 8 shows the $NO_2$ formation results for Samples N11, N25, N26, and N28 at varying temperatures, after regeneration.

TABLE 8

| | Temp. (° C.) | | | | |
|---|---|---|---|---|---|
| | 195 | 210 | 225 | 250 | 300 |
| N11 | 20 | 19.6 | 28.7 | 50.1 | 61.3 |
| N25 | 9.0 | 8.0 | 22.7 | 46.2 | 60.6 |
| N26 | 15.8 | 20.3 | 35.5 | 55.8 | 62.0 |
| N28 | 25.8 | 36.5 | 45.0 | 58.9 | 64.1 |

Tables 6-8 illustrate that the catalysts comprising bulk $MnO_2$ (samples N25, N26, and N28) outperform non Mn-containing catalyst (N11) in terms of $NO_2$ yield. The effect is most pronounced after sulfation and thermal regeneration, where the non-Mn containing catalyst exhibits deactivation, especially at low temperature.

Example 3: Alumina and Mn Precursor Studies—Powder Testing]

Catalysts were prepared as follows: Supports were impregnated with a Mn precursor solution, followed by calcination at 850° C. for 1 h. The Mn-containing supports were then impregnated with Pt precursor solution, resulting in a 3.5 wt % Pt concentration on the support. Water and an alumina binder dispersion (5 wt %) were added; the mixture was stirred. The pH was adjusted to 4.5 using $HNO_3$. The slurries were milled. Zeolite was added if required. The slurries were dried, calcined at 450° C. for 1 h in air, followed by crushing and sieving to achieve a particle size of 250-500 µm. The catalysts were aged at 800° C. for 16 h, in 10% $H_2O$ in air.

Testing was performed as in Example 1.

Table 9 shows the $NO_2$ formation results for the catalysts after aging.

TABLE 9

| | Alumina | Mn Precursor | | Zeolite | Temperature | |
|---|---|---|---|---|---|---|
| Sample | Precursor | 5% | 10% | Included | 210° C. | 250° C. |
| N15 | Pseudo-boehmite | | Mn-acetate | No | 33 | 63 |
| N16 | Pseudo-boehmite | | Mn-nitrate | No | 35 | 63 |
| N17 | Pseudo-boehmite | | Mn-sulfate | No | 22 | 55 |
| N30 | Gamma alumina | — | — | No | 13 | 48 |
| N4 | Gamma alumina | | Mn-acetate | No | 47 | 76 |
| N3 | Gamma alumina | Mn-acetate | | No | 56 | 81 |
| N34 | Gamma alumina | Mn-acetate | | Yes | 57 | 75 |

As illustrated in Table 9, irrespective of alumina precursor or Mn precursor or presence or absence of zeolite, all Mn-containing samples are better than the non-Mn reference for NO oxidation.

Example 4: Core Sample Testing in a Lab Reactor

Part I: Pt+Mn Synergism

Oxidation catalyst composites were prepared by coating two layers of Pt- and/or Pd-containing aqueous slurries onto a cordierite honeycomb monolith substrate. Table 10 shows the content of the top coat for Samples A-D. It is noted that all the samples contain the same bottom coat.

TABLE 10

| | Pt, T/C | Mn, T/C |
|---|---|---|
| SAMPLE A | + | + |
| SAMPLE B | + | − |
| SAMPLE C | − | + |
| SAMPLE D | − | − |

Bottom Washcoat: For four samples, A-D, the same washcoat was applied to a 400 cpsi cordierite honeycomb substrate core 1" D×3" L. The washcoat was prepared as follows: A support material comprising gamma-alumina was impregnated with a water soluble Pt salt (Pt amine) using incipient wetness techniques. Subsequently, the same support material was impregnated with a water soluble Pd salt (Pd nitrate) using incipient wetness techniques. The resulting Pd and Pt-impregnated powder was placed into deionized water with zirconium acetate (5% of total slurry solids by weight $ZrO_2$), and the pH of the resulting aqueous slurry was adjusted to pH 4.5 by the addition of an organic acid. After reducing the particle size to 90% less than 10 μm by milling, the slurry was coated onto the cordierite substrate. The coated monolith was dried and then calcined in the range of 400-550° C. for 2-4 hours. The washcoat loading for the bottom coat was approximately 2.1 $g/in^3$ for a total PGM loading of 21.9 $g/ft^3$, Pt loading of 9.4 $g/ft^3$, and a Pd loading of 12.5 $g/ft^3$.

Sample A

Top Washcoat: The top washcoat was prepared as follows: A support material comprising 5% Mn on $Al_2O_3$ was impregnated with a Pt-amine solution using incipient wetness techniques. The resulting Pt-impregnated powder was diluted with deionized water. The pH of the resulting aqueous slurry was adjusted to pH 4.9 by the addition of $HNO_3$. The slurry was mixed well, and was then milled for 1.5 h, to achieve a particle size of 16 μm. Zeolite was added to the slurry, and the slurry was mixed well. Alumina binder was then added, to obtain 32% solids. The slurry was coated onto the cordierite substrate on top of the bottom coat. The coated monolith was dried and then calcined in the range of 400-550° C. for 2-4 hours. The washcoat loading for the top coat was approximately 1.0 $g/in^3$ for a of Pt loading 28.1 $g/ft^3$.

Sample B

Top Washcoat: The top washcoat was prepared as follows: An alumina support material was impregnated with a Pt-amine solution using incipient wetness techniques. The resulting Pt-impregnated powders were diluted with deionized water. The pH of the resulting aqueous slurry was adjusted to pH 4.5 by the addition of $HNO_3$. The slurry was mixed well, and was then milled to achieve a particle size of 18 μm. Zeolite was added to the slurry, and the slurry was mixed well. Alumina binder was then added, to obtain a 33.3% solids. The slurry was coated onto the cordierite substrate on top of the bottom coat. The coated monolith was dried and then calcined in the range of 400-550° C. for 2-4 hours. The washcoat loading for the top coat was approximately 1.0 $g/in^3$ for a Pt loading of 28.1 $g/ft^3$.

Sample C

Top Washcoat: The top washcoat was prepared as follows: 5% Mn on $Al_2O_3$ was added to deionized water. The pH of the resulting aqueous slurry was adjusted to pH 4.7 by the addition of $HNO_3$. The slurry was mixed well, and was then milled to achieve a particle size of 19 μm. Zeolite was added to the slurry, and the slurry was mixed well. Alumina binder was then added, to obtain a 34% solids. The slurry was coated onto the cordierite substrate on top of the bottom coat. The coated monolith was dried and then calcined in the range of 400-550° C. for 2-4 hours. The washcoat loading for the top coat was approximately 1.0 $g/in^3$ for a Pt loading of 0 $g/ft^3$.

Sample D

Top Washcoat: The top washcoat was prepared as follows: An alumina support was added to deionized water. The slurry was mixed well, and was then milled to achieve a particle size of 22 μm. The pH was then adjusted to pH 4.4 using $HNO_3$. Zeolite was added to the slurry, and the slurry was mixed well. Alumina binder was then added, to obtain a 33% solids. The slurry was coated onto the cordierite substrate on top of the bottom coat. The coated monolith was dried and then calcined in the range of 400-550° C. for 2-4 hours. The washcoat loading for the top coat was approximately 1.0 $g/in^3$ for a Pt loading of 0 $g/ft^3$.

Samples A through D were tested under laboratory dynamic conditions to simulate the driving conditions of a "New European Driving Cycle" (NEDC).

Table 11 provides the HC, CO, and $NO_2$ performance results for Samples A-D under stabilized conditions (600° C., for 4 h, 10% steam in air).

TABLE 11

| Catalyst | HC Conversion | CO Conversion | % NO to $NO_2$ |
|---|---|---|---|
| Sample A | 81.5 | 76.9 | 36.1 |
| Sample B | 80.3 | 73.5 | 29.5 |
| Sample C | 59.2 | 60.2 | 4.9 |
| Sample D | 54.1 | 58.1 | 6.0 |

Table 12 provides the HC, CO, and $NO_2$ performance results for Samples A-D under aged conditions (800° C., for 25 h, 10% steam/10% $O_2$ in $N_2$).

TABLE 12

| Catalyst | HC Conversion | CO Conversion | % NO to $NO_2$ |
|---|---|---|---|
| Sample A | 64.8 | 56.6 | 17.8 |
| Sample B | 66.0 | 57.2 | 12.4 |
| Sample C | 30.7 | 45.3 | 1.7 |
| Sample D | 36.0 | 49.4 | 2.0 |

Tables 11 and 12 illustrate that there is a synergistic interaction between Mn and Pt such that the catalyst comprising Mn and Pt (Sample A) has better NO conversion than the catalyst not comprising Mn (Sample B). This conversion improvement is not observed for the catalyst comprising only Mn (no Pt) (Sample C). Accordingly, there is a special interaction between Mn and Pt.

Part II: Pt+Mn Top Coat Versus Pt-Only Topcoat

Sample E

An oxidation catalyst composite was prepared by coating two layers of Pt- and/or Pd-containing aqueous slurry onto a cordierite honeycomb monolith substrate.

Bottom Washcoat: The bottom washcoat was prepared as follows: A support material comprising 5% $SiO_2/Al_2O_3$ was impregnated with a Pd nitrate solution. Subsequently, the same support material was impregnated with a Pt-amine. The pH was adjusted to pH 4.7 using $HNO_3$. The slurry was milled to achieve a particle size of 21 μm and a 38% solids content. The slurry was coated onto a honeycomb monolith. The coated monolith was dried and then calcined in the range of 400-550° C. for 2-4 hours. The washcoat loading for the bottom coat was approximately 1.6 $g/in^3$ for a total PGM loading 21.9 $g/ft^3$, Pt loading of 9.4 $g/ft^3$, and Pd loading of 12.5 $g/ft^3$.

Top Washcoat: The top washcoat was prepared as follows: A support material comprising 5% Mn on $Al_2O_3$ was impregnated with Pt-amine. The pH was adjusted to pH 4.8 using $HNO_3$. The slurry was milled to achieve a particle size of 21 μm. Zeolite was added, and the slurry was mixed well. Alumina binder and deionized water were added, to obtain a 37% solids content. The slurry was coated onto the cordierite substrate on top of the bottom coat. The coated monolith was dried and then calcined in the range of 400-550° C. for 2-4 hours. The washcoat loading for the top coat was approximately 1.2 $g/in^3$ for a Pt loading of 28.1 $g/ft^3$.

Sample F

An oxidation catalyst composite was prepared by coating two layers of Pt- and/or Pd-containing aqueous slurry onto a cordierite honeycomb monolith substrate.

Bottom Washcoat was identical to Sample E.

Top Washcoat: The top washcoat was prepared as follows: A support material comprising 5% $SiO_2/Al_2O_3$ was impregnated with Pt-amine. The impregnated solution was then diluted with deionized water and was mixed well. The pH was adjusted to pH 4.6 using $HNO_3$. The slurry was milled to achieve a particle size of 19.6 μm. Zeolite was added, and the slurry was mixed well. Alumina binder and deionized water were added to obtain a 31% solids content. The slurry was coated onto the cordierite substrate on top of the bottom coat. The coated monolith was dried and then calcined in the range of 400-550° C. for 2-4 hours. The washcoat loading for the top coat was approximately 1.2 $g/in^3$ for a Pt loading of 28.1 $g/ft^3$.

Table 13 shows the formulations of Samples E and F.

TABLE 13

| | Sample E | | | | Sample F | | |
|---|---|---|---|---|---|---|---|
| Mn | Total PGM | Pt | Pd | Mn | Total PGM | Pt | Pd |
| Bottom Coat | — | 21.9 | 9.4 | 12.5 | — | 21.9 | 9.4 | 12.5 |
| Top Coat | 5% | 28.1 | 28.1 | 0 | — | 28.1 | 28.1 | 0 |

Samples E and F were tested for performance. The samples were tested under the dynamic conditions similar to Samples A-D Table 14 shows the conversion results for samples E and F.

TABLE 14

| Catalyst | Mn Topcoat | HC Conversion | CO Conversion | % NO to $NO_2$ |
|---|---|---|---|---|
| Sample E | 5% | 75.0 | 63.7 | 26.2 |
| Sample F | — | 72.1 | 59.8 | 18.8 |

As illustrated in Table 15, a catalyst comprising a top coat of Pt and Mn outperforms a non-Mn containing catalyst comprising only Pt in the top coat.

Example 5: Full Size Samples

Samples E and F were also coated onto full size monoliths (4.66"×4", 400/4). The samples were evaluated on a 3 L diesel engine using NEDC test protocol.

Table 16 shows the results for HC and CO conversion, and the tailpipe $NO_2$ for a fresh catalyst.

TABLE 16

| Catalyst | Mn in Top Layer | HC Conversion | CO Conversion | Tailpipe $NO_2$ (g/km) |
|---|---|---|---|---|
| Sample E | 5% | 79 | 65 | 0.3 |
| Sample F | — | 74 | 61 | 0.2 |

Table 17 shows the results for HC and CO conversion, and the tailpipe $NO_2$ for aged catalysts. The catalysts were aged at 800° C. for 16 h, in 10% steam/10% $O_2$ in $N_2$ in an oven.

TABLE 17

| Catalyst | Mn in Top Layer | HC Conversion | CO Conversion | Tailpipe $NO_2$ (g/km) |
|---|---|---|---|---|
| Sample E | 5% | 68 | 51 | 0.2 |
| Sample F | — | 62 | 50 | 0.1 |

The results show that a catalyst containing Mn provides an improvement in NO oxidation to $NO_2$ compared to a catalyst that does not contain Mn. Benefits are observed in NEDC testing (fresh and aged).

Example 6

CO adsorption DRIFT measurements were taken for Example 4, Samples A and B on a Bio-Rad Excalibur FTS 3000 IR spectrometer equipped with a MCT detector and a Harrick high-temperature environmental chamber with ZnSe windows. The samples were ground into a fine powder with a mortar and pestle, and then filled into the sample cup. The sample powders were first dehydrated at 400° C. for 1 h in flowing Ar at the flow rate of 40 ml/min and then cooled down to 30° C. A background spectrum was taken for the sample without probe molecule adsorption. 1% of CO in Ar was introduced into the chamber. IR spectra were taken with CO exposure time, and then the system was equilibrated at 30° C. in flowing Ar gas (without CO) to measure CO desorption. Different spectra were obtained by subtracting spectra for the sample with the CO probe molecule by the background spectrum for the sample without the probe molecule.

Figure 8A:
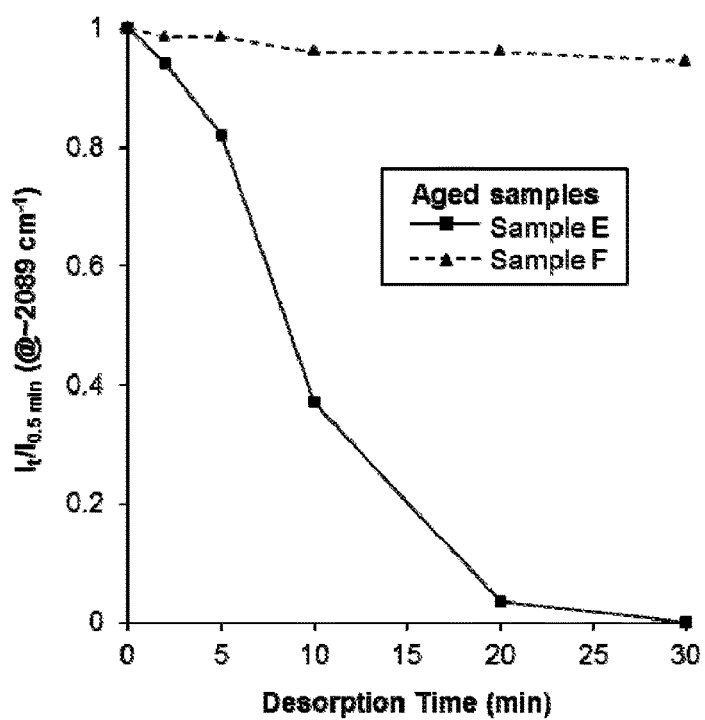
FIGS. 8A-8C are IR spectra showing CO adsorption for catalysts prepared according to the Examples.
Figure 8B:
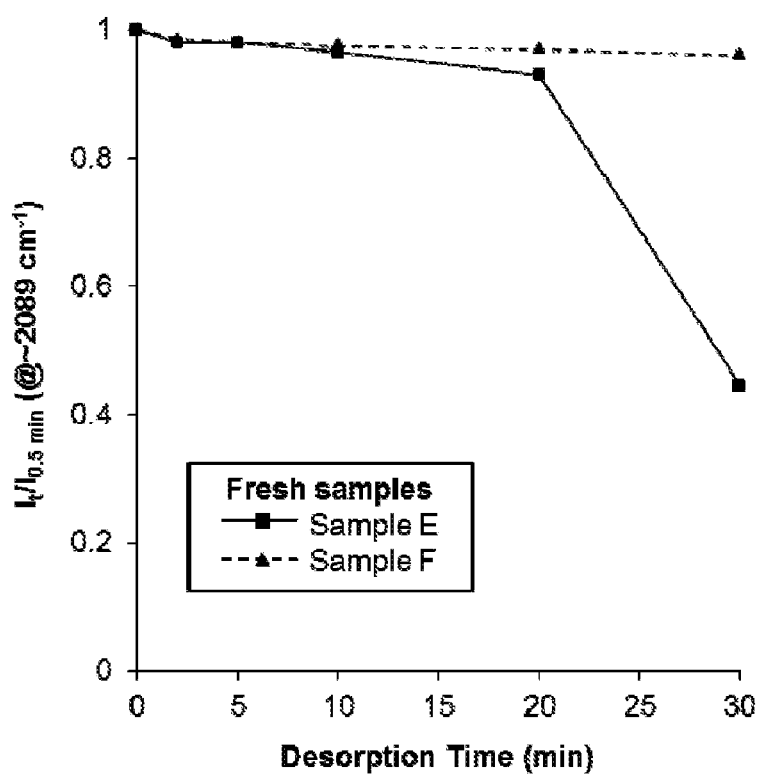
Figure 8C:
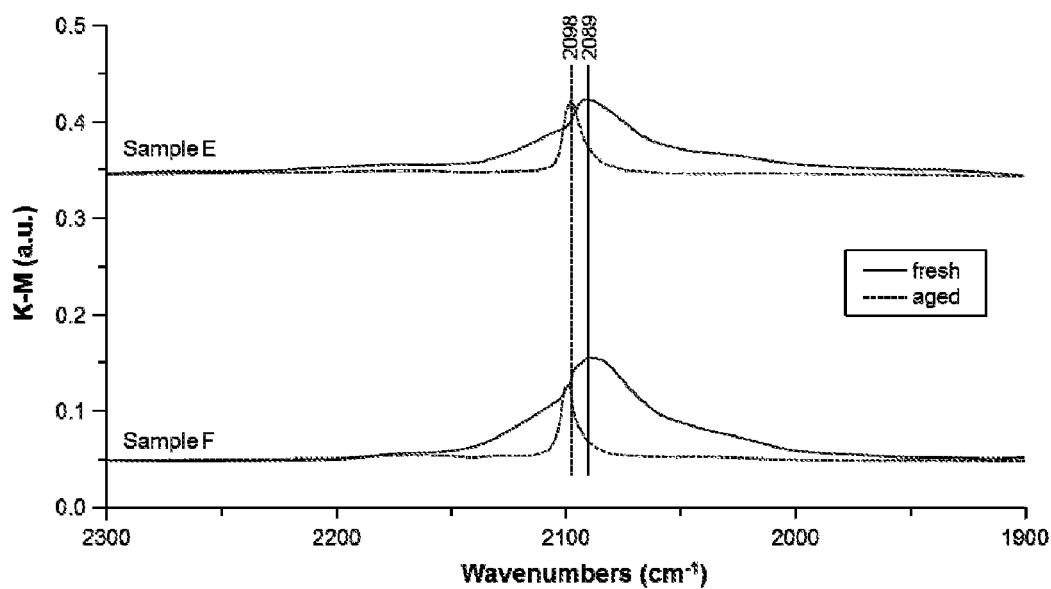

As can be observed in FIGS. 8A-8C, Mn impacts the Pt—CO bond strength. The Mn-containing support weakens the Pt—CO bond strength (@ 2090+/1 $cm^{-1}$), resulting in less impact of CO poisoning on Pt, thereby promoting CO and NO oxidation reactions, especially at low temperatures.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. An oxidation catalyst composite for abatement of exhaust gas emissions from a lean burn engine comprising:
   a carrier substrate having a length, an inlet end, and an outlet end, an oxidation catalyst catalytic material on the carrier, the oxidation catalyst catalytic material including a first washcoat layer comprising a first refractory metal oxide support, a platinum (Pt) component and a palladium (Pd) component in a ratio of Pt to Pd in the range of about 10:1 to 1:10; and a second washcoat layer comprising a second refractory metal oxide support containing Mn, a zeolite, a Pt component, and optionally a Pd component, wherein the Mn content of the second refractory metal oxide support is in the range of 0.1% to 30% by weight, and wherein the Mn is doped with Fe, Ni, Co, Cu, Ce, Sn, Ir, In, or a combination thereof, and wherein the oxidation catalyst composite is effective to abate hydrocarbon and carbon monoxide, and to oxidize NO to $NO_2$ in a lean burn engine exhaust.

2. The oxidation catalyst composite of claim 1, wherein the second washcoat layer further comprises a palladium component, and the Pt:Pd ratio of the second washcoat layer is in the range of 1:0 to 10:1.

3. The oxidation catalyst composite of claim 1, wherein the second washcoat layer is substantially free of palladium.

4. The oxidation catalyst composite of claim 2, wherein the second washcoat layer palladium component is present in an amount in the range of about 0.1 g/ft$^3$ to about 10 g/ft$^3$.

5. The oxidation catalyst composite of claim 1, wherein the first washcoat layer is coated on the carrier substrate, and the second washcoat layer is coated on top of the first washcoat layer.

6. The oxidation catalyst composite of claim 1, wherein the Mn content is in the range of 3 to 10% by weight.

7. The oxidation catalyst composite of claim 1, wherein the Mn is present in a form selected from the group consisting of a Mn-containing solid solution with the refractory metal oxide support, Mn surface dispersed on the refractory metal oxide support by impregnation and discrete manganese oxide particles on the refractory metal oxide support particles.

8. The oxidation catalyst of claim 1, wherein the Mn is derived from a soluble Mn species or from bulk Mn oxides.

9. The oxidation catalyst composite of claim 8, wherein the soluble Mn species is selected from the group consisting of Mn acetate, Mn nitrate, Mn sulfate, and combinations thereof.

10. The oxidation catalyst composite of claim 8, wherein the bulk Mn oxides are selected from MnO, $Mn_2O_3$, $MnO_2$, and combinations thereof.

11. The oxidation catalyst composite of claim 1, wherein the second refractory metal oxide support comprises alumina, silica, zirconia, titania, ceria, or a combination thereof.

12. The oxidation catalyst composite of claim 1, wherein the second washcoat layer comprises a Pt component in an amount in the range of about 10 g/ft$^3$ to 100 g/ft$^3$.

13. The oxidation catalyst composite of claim 12, wherein the second washcoat layer further comprises a Pd component in an amount in the range of about 0.1 g/ft$^3$ to 10 g/ft$^3$.

14. The oxidation catalyst composite of claim 12, wherein the second washcoat layer comprises a hydrothermally stable zeolite in the form of 6 to 12 member ring structures, selected from ZSM-5, beta, mordenite, Y zeolite, chabazite, ferrierite, or combinations thereof.

15. The oxidation catalyst composite of claim 1, wherein the first refractory metal oxide support comprises alumina, silica, zirconia, titania, ceria, or a combination thereof.

16. The oxidation catalyst composite of claim 1, wherein the first washcoat layer comprises a Pt component in an amount in the range of about 10 g/ft$^3$ to 100 g/ft$^3$.

17. The oxidation catalyst composite of claim 16, wherein the first washcoat layer comprises a Pd component in an amount in the range of about 10 g/ft$^3$ to 100 g/ft$^3$.

18. The oxidation catalyst composite of claim 1, wherein the second washcoat layer is substantially free of barium and the first washcoat layer is substantially free of zeolite.

19. The oxidation catalyst composite of claim 1, wherein the second washcoat layer is coated on the carrier substrate, and the first washcoat layer is coated on top of the second washcoat layer.

20. The oxidation catalyst composite of claim 1, wherein the carrier substrate comprises a flow-through monolith.

21. The oxidation catalyst composite of claim 1, wherein the first washcoat layer and the second washcoat layer are both coated on the carrier.

22. The oxidation catalyst composite of claim 1, wherein the first washcoat layer comprises alumina and the second washcoat layer comprises alumina containing Mn in an amount of about 3% to 10% by weight, and wherein the Pt component of the second washcoat layer is present in an amount in the range of about 10 g/ft$^3$ to 100 g/ft$^3$ and the second washcoat layer is substantially free of palladium.

23. A method for treating a diesel engine exhaust gas stream, the method comprising contacting an exhaust gas stream with the oxidation catalyst composite of claim 1.

24. The method of claim 23, further comprising passing the exhaust gas stream to an SCR catalyst composition immediately downstream from the oxidation catalyst composite.

25. The method of claim 24, wherein the SCR catalyst composition is disposed on a wall flow filter monolith.

26. A system for treatment of a lean burn engine exhaust gas stream including hydrocarbons, carbon monoxide, and other exhaust components, the system comprising:
an exhaust conduit in fluid communication with the lean burn engine via an exhaust manifold;
the oxidation catalyst composite of claim 1, wherein the carrier substrate is a flow through substrate; and
a catalyzed soot filter and an SCR catalyst located downstream from the oxidation catalyst composite.

27. The system of claim 26, wherein the oxidation catalyst composite is added to a lean $NO_x$ trap.

28. The system of claim 27, wherein the lean $NO_x$ trap comprises a barium component and a rhodium component.

29. The system of claim 26, wherein the SCR catalyst is coated onto the catalyzed soot filter.

30. The system of claim 26, wherein the SCR catalyst is on a flow through substrate immediately downstream from the oxidation catalyst and the catalyzed soot filter is downstream from the SCR catalyst.

* * * * *